June 21, 1932.   A. SCHRAVEN   1,863,673
INDICATOR JAW GAUGE
Filed Jan. 29, 1930
Fig. 1.
Fig. 2.
Fig. 3.
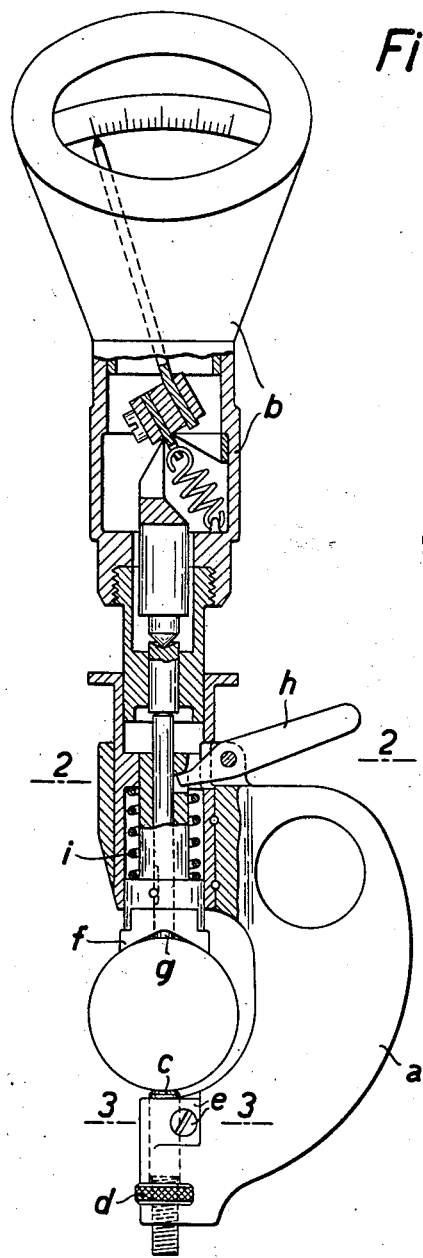
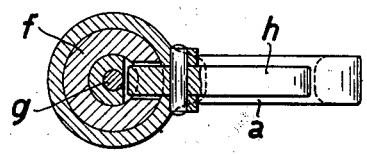
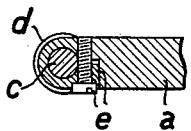
Inventor
Alexander Schraven
By Knight Bros
attorneys Patented June 21, 1932

1,863,673

UNITED STATES PATENT OFFICE

ALEXANDER SCHRAVEN, OF ESSEN, GERMANY, ASSIGNOR TO FRIED. KRUPP AKTIEN-GESELLSCHAFT, OF ESSEN-ON-THE-RUHR, GERMANY

INDICATOR JAW GAUGE

Application filed January 29, 1930, Serial No. 424,346, and in Germany February 11, 1929.

This invention relates to an indicator jaw gauge which permanently may remain on the work piece during machining and always adjusts itself automatically to the correct measuring position.

In order that my invention can be more readily understood, an embodiment of the same is illustrated by way of example in the drawing which accompanies and forms part of this specification. In this drawing Figure 1 is a sectional view of the entire gauge, Figure 2 is a section on line 2—2 of Figure 1, seen from above, and Figure 3 is a section on line 3—3 of Figure 1, likewise seen from above.

The gauge possesses a jaw frame $a$, the jaws of which are rigid relatively to one another, and on the one end of which is mounted a feeling lever mechanism $b$ while its other end carries an anvil $c$. This anvil can be displaced in the measuring direction by means of a knurled nut $d$ and fixed by a clamp piece $e$. Centering of the gauge is made possible by a centering block $f$ that can be displaced by means of a lever $h$ against the action of a spring $i$ and within which is guided a gauging bolt $g$. The latter is in operative connection with the feeling lever mechanism $b$.

After the centering block $f$ has been lifted by depressing lever $h$, the gauge is slid on the shaft to be measured. When lever $h$ is released, the spring $i$ firmly presses the block $f$ on to the shaft so that the gauge centers itself automatically, that means the gauging bolt $g$ and the anvil $c$ are exactly diametrally opposite to one another.

The described gauge warrants full security of measurement, because owing to the provision of a spring-influenced centering block three points come to abut with certainty on the piece to be measured. During machining the gauge permanently remains in operative position on the work piece and is held therein by means of any suitable appliance (not shown) that admits all required motions.

What I claim and desire to secure by Letters Patent, is:—

A gauge of the class described comprising a frame forming two jaws rigid relatively to one another, an anvil mounted on one of said jaws, a shiftable spring-influenced centering block and a gauging bolt mounted on the other jaw, a two-armed lever pivoted on said frame and adapted to lift said block against the spring action, and a feeling lever indicating mechanism in operative connection with said gauging bolt.

The foregoing specification signed at Cologne, Germany, this 14th day of January, 1930.

ALEXANDER SCHRAVEN.